United States Patent
Bhargava

(10) Patent No.: US 10,489,492 B2
(45) Date of Patent: Nov. 26, 2019

(54) SENDING FEATURE-INSTRUCTION NOTIFICATIONS TO USER COMPUTING DEVICES

(71) Applicant: Dropbox, Inc., San Francisco, CA (US)

(72) Inventor: Nikhil Bhargava, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 570 days.

(21) Appl. No.: 14/965,828

(22) Filed: Dec. 10, 2015

(65) Prior Publication Data

US 2017/0168856 A1  Jun. 15, 2017

(51) Int. Cl.
*G06F 17/22* (2006.01)
*H04L 29/08* (2006.01)
*H04L 12/58* (2006.01)
*G06F 17/24* (2006.01)
*G06F 16/23* (2019.01)

(52) U.S. Cl.
CPC ...... *G06F 17/2235* (2013.01); *G06F 16/2358* (2019.01); *G06F 17/241* (2013.01); *H04L 51/046* (2013.01); *H04L 67/1095* (2013.01)

(58) Field of Classification Search
CPC .... G06Q 10/10; G06Q 30/0255; H04L 51/24; H04L 67/22; H04L 51/32; H04L 67/1095; H04L 51/046; G06F 3/04842; G06F 17/2235; G06F 9/453; G06F 17/241; G06F 16/2358; H04N 21/472
See application file for complete search history.

(56) References Cited

U.S. PATENT DOCUMENTS

| | | | |
|---|---|---|---|
| 5,018,082 A * | 5/1991 | Obata | G06F 9/453 715/707 |
| 5,671,428 A | 9/1997 | Muranaga et al. | |
| 7,072,940 B1 * | 7/2006 | Day | G06Q 10/10 707/999.01 |
| 7,698,421 B2 | 4/2010 | Bernard et al. | |
| 8,682,989 B2 | 3/2014 | Meislels et al. | |
| 8,706,810 B2 | 4/2014 | Vishnubhatla et al. | |
| 8,862,676 B1 * | 10/2014 | Bilinski | H04L 67/26 709/200 |
| 9,020,887 B2 | 4/2015 | Ngo et al. | |
| 9,237,119 B1 * | 1/2016 | Dyball | H04L 51/046 |
| 9,319,369 B2 * | 4/2016 | Faaborg | H04L 51/24 |
| 9,880,989 B1 * | 1/2018 | Cadabam | G06F 17/241 |
| 10,027,614 B1 * | 7/2018 | Agrawal | H04L 51/12 |
| 2006/0282762 A1 | 12/2006 | Diamond et al. | |

(Continued)

OTHER PUBLICATIONS

Glance et al., "Collaborative Document Monitoring", AMC, GROUP'01, Sep. 30-Oct. 3, 2001, 8 pages.

*Primary Examiner* — Nicholas Klicos
(74) *Attorney, Agent, or Firm* — Hickman Palermo Becker Bingham LLP

(57) ABSTRACT

A system and method for sending feature-instruction notifications to user computing devices. In one implementation, an online content management system detects a feature-instruction triggering event. If the user that caused the feature-instruction triggering event did not use a feature system of the online content management system, a feature-instruction notification may be sent to the user to educate the user on the feature system of the online content management system.

21 Claims, 5 Drawing Sheets

(56) References Cited

U.S. PATENT DOCUMENTS

| | | | |
|---|---|---|---|
| 2007/0100951 A1* | 5/2007 | Bae | H04L 51/24 709/206 |
| 2007/0174394 A1* | 7/2007 | Jayaweera | G06Q 10/107 709/206 |
| 2007/0192155 A1 | 8/2007 | Gauger | |
| 2007/0271502 A1* | 11/2007 | Bedi | G06F 17/248 715/230 |
| 2007/0277098 A1* | 11/2007 | Shahar | G06Q 10/10 715/210 |
| 2008/0059539 A1* | 3/2008 | Chin | G06Q 10/10 |
| 2008/0201632 A1* | 8/2008 | Hong | G06F 17/30722 715/230 |
| 2009/0113019 A1* | 4/2009 | Yue | H04L 12/189 709/217 |
| 2009/0248801 A1* | 10/2009 | Then | G06Q 10/10 709/204 |
| 2009/0271450 A1 | 10/2009 | Bush | |
| 2010/0311320 A1* | 12/2010 | Jung | H04H 20/86 455/3.01 |
| 2011/0314064 A1* | 12/2011 | Jeyaseelan | H04L 51/24 707/803 |
| 2012/0110429 A1* | 5/2012 | Tzonis | G06Q 10/10 715/230 |
| 2012/0179955 A1* | 7/2012 | French | G06F 17/30899 715/207 |
| 2012/0198355 A1* | 8/2012 | Lau | G06Q 10/10 715/752 |
| 2013/0031190 A1* | 1/2013 | Chan | G06Q 30/02 709/206 |
| 2013/0041716 A1* | 2/2013 | Taylor | G06Q 30/00 705/7.29 |
| 2013/0097498 A1* | 4/2013 | Steinberg | G06F 3/04892 715/708 |
| 2013/0124978 A1* | 5/2013 | Horns | G06F 17/241 715/243 |
| 2013/0132814 A1* | 5/2013 | Mangini | G06F 17/24 715/230 |
| 2013/0132886 A1* | 5/2013 | Mangini | G06Q 10/10 715/781 |
| 2013/0239023 A1* | 9/2013 | Konishi | G06Q 50/00 715/753 |
| 2013/0246901 A1 | 9/2013 | Massand | |
| 2013/0325922 A1* | 12/2013 | Chaudhri | G06Q 10/10 709/203 |
| 2014/0082093 A1* | 3/2014 | Savage | H04L 41/50 709/206 |
| 2014/0101780 A1* | 4/2014 | Zuber | G06Q 30/04 726/28 |
| 2014/0123002 A1* | 5/2014 | Wessling | G06F 17/241 715/273 |
| 2014/0201131 A1 | 7/2014 | Burnman et al. | |
| 2014/0281870 A1 | 9/2014 | Vogel et al. | |
| 2014/0310345 A1 | 10/2014 | Megiddo et al. | |
| 2014/0342723 A1* | 11/2014 | Rogers | H04W 76/20 455/419 |
| 2014/0365579 A1* | 12/2014 | Thrasybule | H04L 67/26 709/205 |
| 2015/0081773 A1 | 3/2015 | Ansel et al. | |
| 2015/0134600 A1 | 5/2015 | Eisner et al. | |
| 2015/0163206 A1* | 6/2015 | McCarthy | G06F 21/6227 713/171 |
| 2016/0057154 A1* | 2/2016 | Ferguson | H04L 63/104 726/7 |
| 2016/0253719 A1* | 9/2016 | Akpala | G06Q 30/0282 705/347 |
| 2016/0308940 A1* | 10/2016 | Procopio | G06F 17/30144 |
| 2016/0380915 A1* | 12/2016 | Umapathy | G06F 9/451 709/226 |
| 2017/0083165 A1* | 3/2017 | Ali | G06F 3/0481 |
| 2017/0090704 A1* | 3/2017 | Hu | G06F 3/0484 |
| 2017/0150331 A1* | 5/2017 | Van Snellenberg | H04W 4/14 |
| 2017/0185687 A1* | 6/2017 | Pai | G06Q 10/101 |
| 2017/0289210 A1* | 10/2017 | Pai | H04L 65/403 |

\* cited by examiner

SENDING FEATURE-INSTRUCTION NOTIFICATIONS TO USER COMPUTING DEVICES

TECHNICAL FIELD

The present Application relates to online content management systems. More specifically, the example embodiment(s) of the present invention described below relate to sending feature-instruction notifications to user computing devices.

BACKGROUND

Many users store content items with online content management systems. Such systems typically allow users to upload a content item to a server computer accessible via the Internet or another communications network. Users can access the content item from their personal computing device. One well-known online content management system is the Dropbox™ file hosting service provided by Dropbox, Inc. of San Francisco, Calif. Storing a content item with an online content management system allows users to back up, share, synchronize, access, and store their content items.

Multiple users may use an online content management system to collaborate on a content item. Typically, the work flow for collaboration amongst multiple users relies on using a third-party tool for communication between the users. For example, User A may start working on a content item, then save a copy in the online content management system. Then, User A will notify User B about what tasks they completed and what tasks need to be worked on in the content item, typically through some separate communication tool (e.g. email, instant message, etc.). Next, User B will work on the content item. When User B is done working, they will save a copy in the online content management system and will again notify User A about what tasks they completed and what tasks need to be worked on through some separate communication tool (e.g. email, instant message, etc.). Over time, the history of document handoffs and collaboration between the users is fragmented across multiple communications (e.g. various emails, instant messages, etc.). Additionally if a new user, User C needs to work on the content item, they would not have access to the communications between User A and User B.

Online content management systems have numerous features that can improve the efficiency of users that are collaborating on a digital item. For example, a comment system in an online content management system allows users to save comments that contain information regarding the digital item in the online content management system. These comments can include the necessary document handoff communications. However, a comment system is only effective if the collaborating users actually submit comments to the comment system when they make changes to a content item. Given the shortcomings of existing document handoffs, there is a need for a system that can educate users about the features of the online content management system and value of using the comment system to improve the efficiency of collaboration amongst users. The present invention fulfills this and other needs.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which.

DESCRIPTION OF THE EXAMPLE EMBODIMENT(S)

Figure 1:
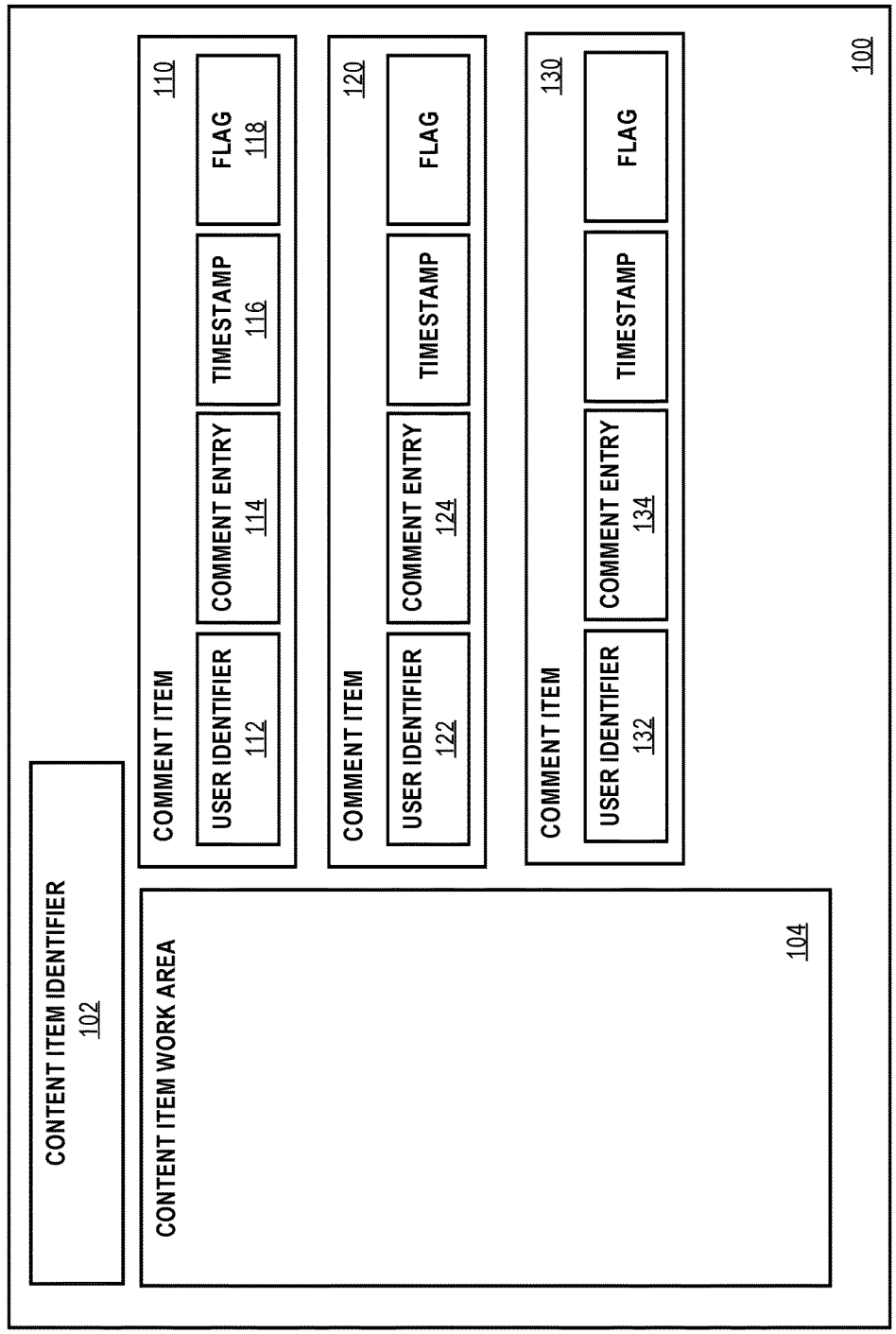
FIG. 1 is a diagram of an example comment system graphic user interface (GUI).

In the following description, for the purposes of explanation, numerous specific details are set forth in order to provide a thorough understanding of the example embodiment(s) in the present invention. It will be apparent, however, that the example embodiment(s) may be practiced without these specific details. In other instances, well-known structures and devices are shown in block diagram form in order to avoid unnecessarily obscuring the example embodiment(s).

Online Content Management System

Today, many users host their personal digital information with online content management systems. Such online content management systems allow users to upload their personal digital information for storage at system-operated server computers accessible to user computing devices via the Internet or other communications network. One well-known online content management system is the Dropbox™ file hosting service provided by Dropbox, Inc. of San Francisco, Calif. Storing personal digital information with an online content management system provides a number of benefits to users. For example, such systems typically allow users to back up, share, synchronize, access and store their hosted digital information.

The online content management system may host users' content items. A content item includes a collection of digital information. Some non-limiting examples of a content item include, but are not limited to, a word processing document, a spreadsheet document, a digital image, and other types of files, documents, and digital media. A content item may correspond to a standardized or conventional file type such that the content of the content item conforms to a standardized or conventional data format associated with that file type. Some standardized and conventional file types to which a content item may correspond to include, but are not limited to, image file types (e.g., .jpg, .tiff, .gif, .png), music file types (e.g., .mp3, .aiff, .m4a, .wav), movie file types (e.g., .mov, .mp4, .m4v), word processing file types (e.g., .doc, .docx, .pages), presentation file types (e.g., .ppt, .pptx, .key), spreadsheet file types (e.g., .xls., .xlsx, .numbers), web page file types (e.g., .htm, .html), and text file types (e.g., .txt). While in some instances a content item corresponds to a standardized or conventional file type, a content item corresponds to a proprietary or unknown file type in other instances. A content item can also include folders or other mechanisms of grouping content items together with different behaviors, such as collections, playlists, albums, etc. For example, an account can include a photos folder that is intended for photos and that provides specific attributes and actions tailored for photos; an audio folder that provides the ability to play back audio files and perform other audio related actions; or other special purpose folders.

The above discussion provides just some examples of possible types of content items that may be among a user's content items hosted with the online content management system. A user may host all of these types of content items with the online content management system, or a subset or a superset thereof.

The online content management system allows multiple user accounts to collaborate on one or more content items. For example, the online content management system stores permission settings that determine which individual user accounts can view, edit, modify, and/or delete a content item. The online content management system can further store permission settings for a team of multiple user accounts, as well as permission settings for a single user account. In one embodiment, content items in the online content management system may be arranged in folders and the folders may be further arranged in other folders. A folder may have its own permission settings regarding what user accounts can view, edit, modify and/or delete a content item.

In one embodiment, an online content management system supports content item version control. When a user modifies and/or saves a content item in the online content management system, a new version of the content item is created and stored in the online content management system. A user can access older versions of the content item in the online content management system.

An online content management system synchronizes data across multiple users. For example, when multiple users are collaborating on a shared content item, the online content management system notifies and updates the user computing devices about changes to that shared content item. Maintaining synchronized access to a shared content item in an online content management system ensures that the users have access to the latest content item.

User computing devices can access the online content management system via various client systems, including, but not limited to, web browsers, mobile device apps, desktop computer applications, and/or desktop application plugins.

Comment System

The online content management system may include feature systems that improve the ability of users to collaborate efficiently on a shared content item. For example, feature systems help improve user communication, security, and the ability to search for content items in the online content management system. In one embodiment, a feature system comprises a comment system that allows users to provide comments regarding changes made to a shared content item.

FIG. 1 depicts an example of a comment system graphic user interface (GUI) 100 that may be presented on a user computing device. In this example, GUI 100 is a web page that allows a user who has access to a content item to view, edit, and/or delete comments associated with that content item. Content item identifier 102 identifies the current content item that is being accessed by the user computing device. In one example embodiment, content item identifier 102 may include the filename of the content item, the version number of the content item, the file path of the content item, and/or an icon for the associated file type of the content item.

In one example, GUI 100 may display a content item work area 104. Content item work area 104 provides a preview of a particular content item. For example, if the content item is a word processing document, content item work area 104 provides a preview of the contents of the word processing document and allows the user to scroll through the contents of the content item. In another example, content item work area 104 provides an interface for the user to edit and save the content item. For example, if the content item is a word processing document, content item work area 104 allows the user to view, edit, format, and save the content item in a manner similar to a conventional word processing application.

GUI 100 may display one or more comment items 110, 120, and 130. Comment items 110, 120, and 130 can behave similarly and their subcomponents (e.g. 112, 122, and 132) are analogous. In one embodiment, a set of comment items 110, 120, and 130 are associated with a single version of a content item. In another embodiment, comment items 110, 120, and 130 are associated with a content item, independent of what versions exist for the content item. Comment items 110, 120, and 130 are viewable by user accounts that have the appropriate permission settings to view comment items related to this content item. In one embodiment, any user that can view the content item can see all the comment items related to that content item. In another embodiment, comment item permissions are independent of the permissions to view the content item.

Comment item 110 encompasses a collection of data related to a comment that a user submits regarding the content item. Comment item 110 may include a user identifier 112 that indicates the author of the comment item 110. Including the user identifier 112 is helpful because it allows subsequent users to determine who left particular comments regarding the content item. User identifier 112 may include the comment author's username, the comment author's name, and/or the comment author's initials. In one embodiment, user identifier 112 may include a thumbnail picture of the comment author of the comment item. In one embodiment, the user identifier 112 is automatically populated with the comment author's user identifier information when the comment author saves a comment. In another embodiment, the user identifier 112 is editable, to allow a user to change the contents of the user identifier 112 where the comment author is different than the person who is submitting the comment item 110 into the GUI 100. For example, a supervisor user may ask an assistant user to create comment item 110 for a particular content item. The assistant user can modify user identifier 112 to reflect the supervisor user's user identifier information instead the of the assistant user's user identifier information, since the supervisor provided the comment.

Comment item 110 further includes a comment entry 114 that indicates the comment of the comment item 110. In one embodiment, comment entry 114 is a text field that is populated with the comment provided by the comment author. Comment entry 114 can provide some information regarding changes to the content item. Leaving comments regarding a content item is helpful because it allows users that have access to the content item to communicate efficiently. For example, a user may leave a comment in comment entry 114 that describes what revisions that user made to the content item. In another example, a user may leave a comment in comment entry 114 that describes what tasks still need to be performed on the content item.

In one embodiment, a user may also include a link in comment entry 114. A link provides access to some other resource. There are many possible types of links that may be supported (e.g. HTML hyperlink, email address, and/or a mobile device OS deep link). The ability to include links in a comment entry 114 is helpful because it allows users to share information about the content item more efficiently. For example, a comment author can provide a link to a second content item that has relevant information for subsequent editors of the first content item.

In one embodiment, a user may also include a tag in comment entry 114. Tags can include a subject matter tag (e.g. "# Conclusion") and/or a user tag (e.g. "@JaneDoe"). Tags are helpful because they can provide meaningful information about the comment item 110. For example, a subject matter tag could be used to identify all comments that relate to the Conclusion section of a word processing document stored as a content item (e.g., "# Conclusion"). Users could use the subject matter tag to search for comment items regarding this subject matter. Likewise, a user tag is helpful because it can help identify one or more person(s) that might be interested in a particular comment item 110. While the above examples use specific symbols to denote subject tags (e.g. "#") and user tags (e.g. "@"), these tags can be implemented without these specific symbols. Comment entry 114 may further include an actionable save button, which, when pressed, will save the contents of the comment item in the online content management system and will synchronize the comment item with other user accounts that have access to the comment item.

Comment item 110 may include a timestamp 116 that indicates what day and/or time the comment item was last created and/or modified. Comment item 110 may further include one or more flags 118. Flag 118 is a marker for comment item 110 and may take the form of text, an icon, and/or a checkbox. For example, flag 118 may be a favorite bookmark for a user to select and save comment item 110 as a favorite comment item. By identifying comment item 110 as a favorite, the user can more efficiently find comment item 110 among other comment items. In another embodiment, flag 118 may be a checkbox to indicate that comment item 110 has been resolved. For example, a comment author can create comment item 110 that describes an action item that needs to be performed by a colleague user. When the colleague user completes the particular action item identified by comment item 110, the colleague user can click the checkbox of flag 118 to indicate that the action item has been completed.

Comment Item Notification

In one embodiment, whenever a comment item 110 is saved in the online content management system, comment item 110 is synchronized to user computing devices that have access to the content item. For example, users are sent a comment item notification regarding the new content item. The comment item notification notifies the user(s) that a new comment has been saved for the content item. The comment item notification is helpful because it encourages users that are collaborating on a content item to view comments left by other collaborators.

The online content management system can be configured to send comment item notifications to a subset of users. For example, in one embodiment, whenever a comment item 110 is saved, users that have previously edited and/or viewed the content item are sent a comment item notification. In another embodiment, whenever a comment item 110 is saved, users that have previously edited and/or viewed the content item within a predetermined period of time are sent a comment item notification. For example, if the predetermined period of time is configured as seven days, the system can send the comment item notification to users that have edited and/or viewed the content item within the last seven days. Information regarding the predetermined period of time can be stored in the online content management system.

In another example embodiment, whenever a comment item 130 is saved, users that have been tagged in comment entry 134 are sent a comment item notification. In another example embodiment, whenever a comment item 130 is saved, users that have been tagged in any comment entries related to the content item (e.g. comment entry 114, comment entry 124, and/or comment entry 134) are sent a comment item notification. In another example embodiment, whenever a comment item 110 is saved, users that have permission to view and/or edit the content item are sent a comment item notification. In another example embodiment, whenever a comment item 110 is saved, a list of predetermined users are sent a comment item notification.

The format of the comment item notification can vary depending on the implementation, and may include: email, SMS message, instant message, voicemail, or computing device notification event (e.g. mobile device push notification, toast notification, system tray notification, notification center update, web browser popup, etc.). In one embodiment, the process will select the format of the comment item notification based on a stored preference of the recipient. The notification can be sent to the user via one or more protocols (e.g. HTTP, SMTP, and SMS).

The comment item notification may, in one example, include comment item 110. In another embodiment, the comment item notification may include a link to the content item in the online content management system. In another embodiment, the comment item notification may wait a predetermined period of time and aggregate multiple comment items into a single notification. Aggregating comment item notifications can reduce the number of notifications that need to be sent to the user computing device, thereby improving the system efficiency.

Example Process

Figure 2:
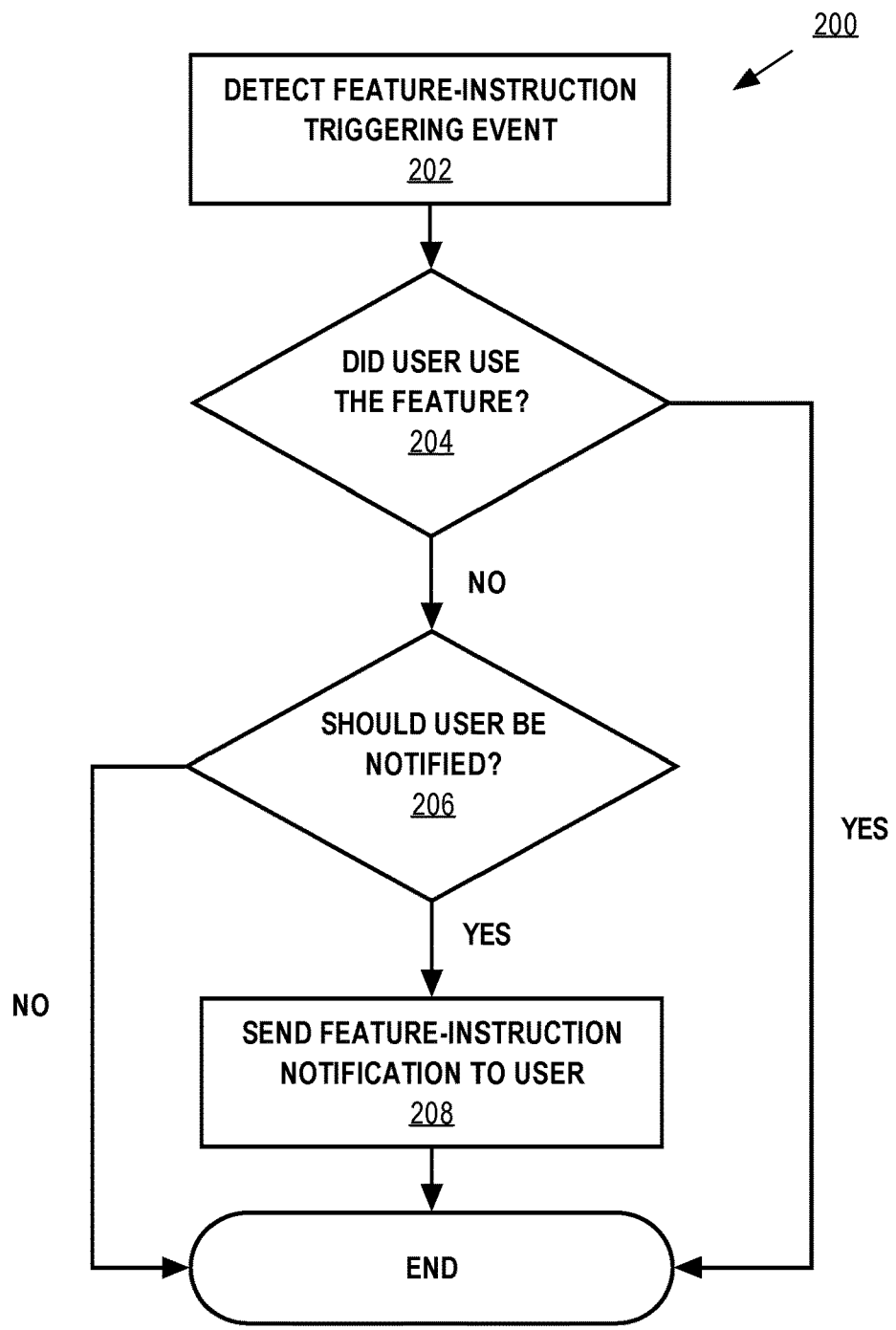
FIG. 2 is a flow diagram of a computer-implemented technique for sending feature-instruction notifications to user computing devices.

FIG. 2 is a flow diagram of a process 200 for detecting a feature-instruction triggering event in an online content management system, determining whether the user has received a feature-instruction notification for using the feature system of the online content management system, and sending a notification to the user regarding the feature system. As to the flow diagram, each block within the flow diagram represents both a method step and an apparatus element for performing the method step. Depending upon the implementation, the corresponding apparatus element may be configured in hardware, software, firmware, or combinations thereof.

While the embodiments and examples described herein generally relate to sending a feature-instruction notification to notify a user of a comment system in an online content management system, a person having ordinary skill in the art would recognize that the process of sending a feature-instruction notification to a user computing device can be applied to any feature system of an online content management system that is not being used by the user.

Feature-Instruction Triggering Event Detection

In block 202, a feature-instruction triggering event is detected. A feature-instruction triggering event may be generated by the online content management system, or collected from a user computing device by the online content management system. For example, in the comment system example, a feature-instruction triggering event may be generated by the online content management system when a content item has been created and/or edited. The feature-instruction triggering event may identify the content item that has been created and/or edited. The feature-instruction triggering event may further identify the user or users who last modified the content item. The feature-instruction triggering event may further include information regarding the type of edit that was made (e.g. new content item created, content item edited, deleted content item, etc.).

A feature-instruction triggering event may be generated by the online content management system or collected from a user computing device by the online content management system whenever a content item has been modified in any way. For example, a feature-instruction triggering event may be generated when a new content item is created and stored in the online content management system. Likewise, a feature-instruction triggering event may be generated when an existing content item has been modified, such as changes to a content item have been stored, or a new version of the content item has been stored. In another embodiment, a feature-instruction triggering event may be generated when a content item has been deleted in the online content management system. In yet another embodiment, a feature-instruction triggering event may be generated when a content item has been moved within the directory structure of the online content management system. In one embodiment, a feature-instruction triggering event may be generated when access permissions for the content item in the online content management system have been modified.

Determining Whether a User Should Receive a Feature-Instruction Notification

In block 204, the process determines whether the user associated with the feature-instruction triggering event that was detected in block 202 used the feature of the online content management system. For example, in one embodiment, block 202 determines whether the user left a comment regarding the content item in the comment system of the online content management system. In one embodiment, block 204 is executed immediately when the feature-instruction triggering event is detected in block 202. In another embodiment, block 204 is executed a predetermined amount of time after the feature-instruction triggering event is detected in block 202. For example, block 204 executes to determine if the user used the feature system only after a grace period has elapsed. The grace period can be configured in the online content management system and may either be a period of time of inactivity (e.g. 1 hour), or may specify a specific time for the block 204 to execute (e.g. 12:01 am). Some users repeatedly save content items while they continue to edit them. Some users will only use the comment system after they have completely finished editing the content item. Therefore, waiting a grace period is helpful because it reduces the likelihood that the block 204 is executed prematurely before the user has had an opportunity to use the comment system after they finished modifying the content item.

If, in block 204, it is determined that the user has used the feature of the online content management system, the process may end. For example, in the comment system example, if the user has left a comment regarding the feature-instruction triggering event, then the process may end. On the other hand, if, in block 204 it is determined that the user has not used the feature of the online content management system, the process may proceed to block 206. For example, in the comment system example, if the user has not left a comment regarding the detected feature-instruction triggering event, the process may proceed to block 206.

In block 206, the process determines whether the user associated with the feature-instruction triggering event that was detected in block 202 should be notified about the feature system. In one embodiment, the process will always notify the user and will proceed to block 208. In another embodiment, data is stored in the online content management system about what feature-instruction notifications have been sent to the user. If the user has already received a feature-instruction notification at any time about using the comment system, then the user should not be notified in block 206. On the other hand, if the user has not received a feature-instruction notification about using the comment system, then the user should be notified in block 206.

In another embodiment, information concerning the timing of the prior feature-instruction notifications that were sent to the user is stored. If the user was sent a feature-instruction notification within a predetermined amount of time (e.g. the previous 1 week), then the user should not be notified in block 206. If the user was not sent a feature-instruction notification within the predetermined amount of time, then the user should be notified in block 206.

In one embodiment, a user should be notified if they have never been sent a feature-instruction notification regarding the specific content item identified during the detect feature-instruction triggering event 202, even if they have been previously notified regarding different content items.

If, in block 206, it is determined that the user should be notified, then the process may proceed to block 208. On the other hand, if, in block 206 it is determined that the user should not be notified, then the process may end.

Feature-Instruction Notification

In block 208, the process sends a feature-instruction notification to the user identified in the feature-instruction triggering event detected in block 202. The feature-instruction notification provides the user with information regarding the feature system. The format of the feature-instruction notification can vary depending on the implementation, and may include: email, SMS message, instant message, voicemail, or computing device notification event (e.g. mobile device push notification, toast notification, system tray notification, notification center update, web browser popup, etc.). In one embodiment, the process will select the format of the feature-instruction notification based on a stored preference of the user. The feature-instruction notification can be sent to the user via one or more protocols (e.g. HTTP, SMTP, and SMS).

Figure 3:
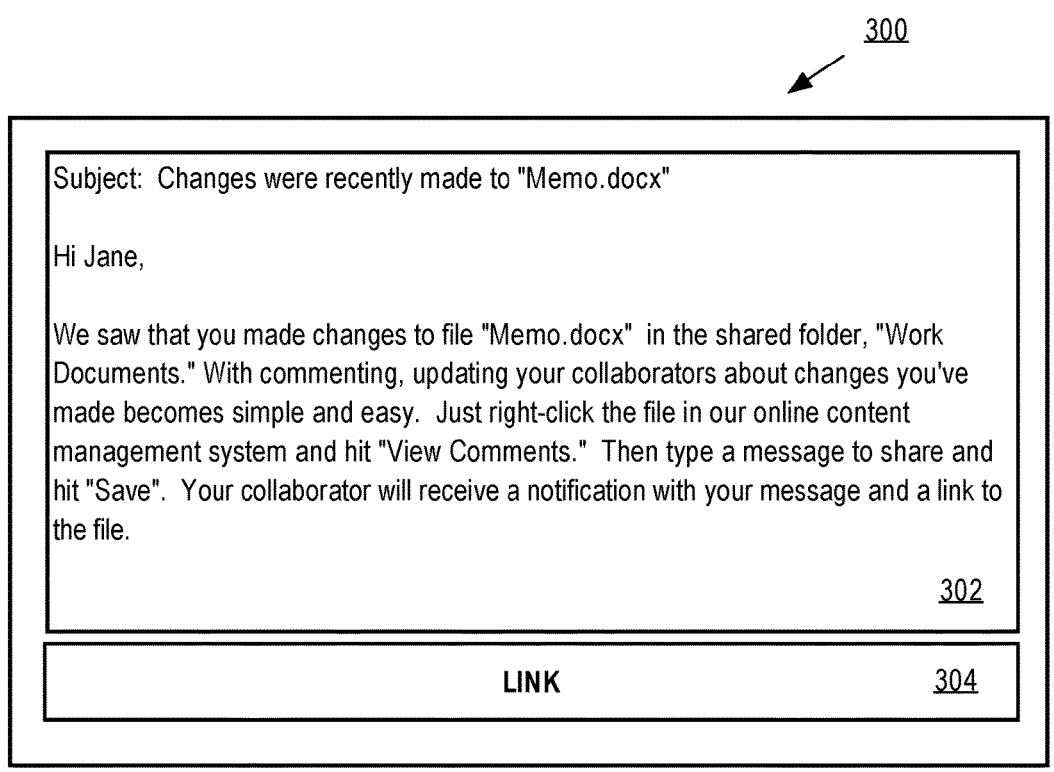
FIG. 3 is an example feature-instruction notification.

FIG. 3 shows an example embodiment of a feature-instruction notification 300 in the form of an email. Feature-instruction notification 300 includes a message body 302. Message body 302 provides a user with information to teach the user about using the comment system of the online content management system. Message body 302 may include a description of how to use the comment system. Furthermore, message body 302 may further include an explanation of how collaborators on a content item will receive comment item notifications. By providing this information in message body 302, feature-instruction notification 300 teaches the user about how to use the comment system and can improve the efficiency of communication amongst collaborators in the online content management system Feature-instruction notification 300 may further include a link 304 that provides access to the comment system for the content item that was modified. Link 304 may be in the form of a text hyperlink, an icon, or other similar link. In one embodiment, when a user clicks on link 304, the system will open an interface to create a new comment item for the content item in the online content management system. For example, in one embodiment, the link 304 will open the comment system for the content item in a web browser. Alternatively, link 304 will open the comment system for the comment item in an application on the user computing device.

In another embodiment, when a user clicks on link 304, the system will prepopulate a suggested comment entry 114 for a new comment item. For example, the prepopulated comment entry 114 may say "I made some changes to this file. Please take a look, and let me know if you have any feedback." By providing a prepopulated comment entry, the online content management system encourages users to use the comment system for document collaboration.

Aggregating Feature-Instruction Notifications

According to one embodiment, in block 206, the process sends the feature-instruction notification according to an aggregation scheme. For example, in one embodiment, in block 206, the process will send the feature-instruction notification to the user computing device immediately. However, in another embodiment, in block 206, the process delays sending the feature-instruction notification in order to aggregate multiple feature-instruction triggering events into a single feature-instruction notification. Aggregating multiple feature-instruction triggering events into a single feature-instruction notification is more efficient because it reduces the number of notifications that need to be sent to the user computing device. Additionally, aggregating multiple feature-instruction triggering events into a single feature-instruction notification will reduce the likelihood that the receiving user will regard multiple feature-instruction notifications as unwanted spam updates.

For example, block 206 may wait a predetermined waiting period (e.g. 1 hour) before sending the feature-instruction notification. While the predetermined waiting period elapses, the process may aggregate multiple feature-instruction triggering events that are associated with the same user into a single feature-instruction notification. When the predetermined waiting period has elapsed, the feature-instruction notification is sent to the user computing device. The predetermined waiting period can be configured in the online content management system.

In another embodiment, block 206 may wait until a pooled notification time (e.g. 12:01 am) before sending the feature-instruction notification. Until the pooled notification time is reached, the process may aggregate multiple feature-instruction triggering events that are associated with the same user into a single feature-instruction notification. When the pooled notification time is reached, the feature-instruction notification is sent to the user computing device.

Conversion Rate System

The online content management system may store information related to the conversion rate of the feature-instruction notifications sent to user computing devices. The conversion rate measures the percentage of users that used the feature system after receiving a feature-instruction notification. For example, with regard to the comment system example, the conversation rate measures the percentage of users that submitted a comment in the comment system after receiving the feature-instruction notification. A higher conversion rate indicates that the feature-instruction notification is more successful in teaching a group of one or more end users to use the feature system than a lower conversion rate. Data regarding the conversion rate may be stored by the online content management system to improve future feature-instruction notifications.

In one embodiment, the conversion rate across all feature-instruction notifications is stored. In another embodiment, different conversion rates are stored for feature-instruction notifications that contain different formats. For example, a first conversion rate may be stored for feature-instruction notifications that are configured to include a link to the content item in the comment system (e.g., link 304) and a second conversion rate can be stored for feature-instruction notifications that omit link 304. In another embodiment multiple conversion rates can be stored for different message bodies 302.

In another embodiment, different conversion rates are stored for feature-instruction notifications that use different aggregation schemes. For example, a first conversion rate can measure the conversion rate of feature-instruction notifications that are sent immediately after detecting a feature-instruction triggering event. A second conversion rate can measure the conversion rate of feature-instruction notifications that are aggregated over a predetermined period of time. A third conversion rate can measure the conversion rate of feature-instruction notifications that are aggregated until a pooled notification time. By comparing different conversion rates, the process can assess and compare the effectiveness of different types of feature-instruction notifications. Based on this assessment, the process can select a specific type of feature-instruction notification in order to maximize the conversion rate. By doing so, the process is able to select the feature-instruction notification protocol that is most effective with a set of target users, thereby maximizing the number of users that use the feature system.

Basic Computing Device

Figure 4:
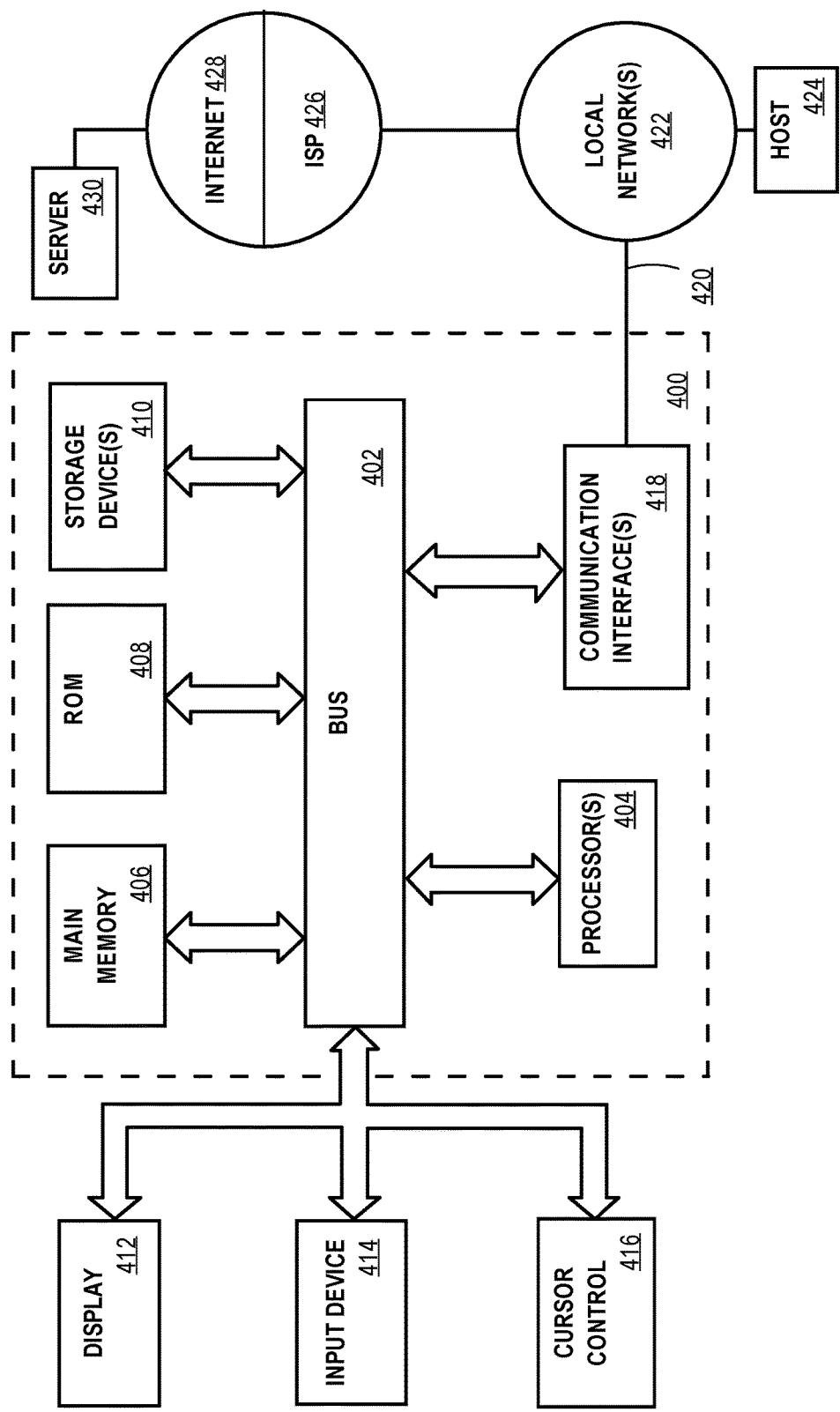
FIG. 4 is a very general block diagram of a computing device in which the example embodiment(s) of the present invention may be embodied.

Referring now to FIG. 4, it is a block diagram that illustrates a basic computing device 400 in which the example embodiment(s) of the present invention may be embodied. Computing device 400 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 400 may include a bus 402 or other communication mechanism for addressing main memory 406 and for transferring data between and among the various components of device 400.

Computing device 400 may also include one or more hardware processors 404 coupled with bus 402 for processing information. A hardware processor 404 may be a general purpose microprocessor, a system on a chip (SoC), or other processor.

Main memory 406, such as a random access memory (RAM) or other dynamic storage device, also may be coupled to bus 402 for storing information and software instructions to be executed by processor(s) 404. Main memory 406 also may be used for storing temporary variables or other intermediate information during execution of software instructions to be executed by processor(s) 404.

Software instructions, when stored in storage media accessible to processor(s) 404, render computing device 400 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 400 also may include read only memory (ROM) 408 or other static storage device coupled to bus 402 for storing static information and software instructions for processor(s) 404.

One or more mass storage devices 410 may be coupled to bus 402 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 410 (e.g., the main hard disk for the device) stores a body of program and data for directing operation of the computing device, including an operating system, user application programs, driver and other support files, as well as other data files of all sorts.

Computing device 400 may be coupled via bus 402 to display 412, such as a liquid crystal display (LCD) or other electronic visual display, for displaying information to a computer user. In some configurations, a touch sensitive surface incorporating touch detection technology (e.g., resistive, capacitive, etc.) may be overlaid on display 412 to form a touch sensitive display for communicating touch gesture (e.g., finger or stylus) input to processor(s) 404.

An input device 414, including alphanumeric and other keys, may be coupled to bus 402 for communicating information and command selections to processor 404. In addition to or instead of alphanumeric and other keys, input device 414 may include one or more physical buttons or switches such as, for example, a power (on/off) button, a "home" button, volume control buttons, or the like.

Another type of user input device may be a cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

While in some configurations, such as the configuration depicted in FIG. 4, one or more of display 412, input device 414, and cursor control 416 are external components (i.e., peripheral devices) of computing device 400, some or all of display 412, input device 414, and cursor control 416 are integrated as part of the form factor of computing device 400 in other configurations.

Functions of the disclosed systems, methods, and modules may be performed by computing device 400 in response to processor(s) 404 executing one or more programs of software instructions contained in main memory 406. Such software instructions may be read into main memory 406 from another storage medium, such as storage device(s) 410. Execution of the software instructions contained in main memory 406 cause processor(s) 404 to perform the functions of the example embodiment(s).

While functions and operations of the example embodiment(s) may be implemented entirely with software instructions, hard-wired or programmable circuitry of computing device 400 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more software instructions to processor(s) 404 for execution. For example, the software instructions may initially be carried on a magnetic disk or solid-state drive of a remote computer. The remote computer can load the software instructions into its dynamic memory and send the software instructions over a telephone line using a modem. A modem local to computing device 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor(s) 404 retrieves and executes the software instructions. The software instructions received by main memory 406 may optionally be stored on storage device(s) 410 either before or after execution by processor(s) 404.

Computing device 400 also may include one or more communication interface(s) 418 coupled to bus 402. A communication interface 418 provides a two-way data communication coupling to a wired or wireless network link 420 that is connected to a local network 422 (e.g., Ethernet network, Wireless Local Area Network, cellular phone network, Bluetooth wireless network, or the like). Communication interface 418 sends and receives electrical, electromagnetic, or optical signals that carry digital data streams representing various types of information. For example, communication interface 418 may be a wired network interface card, a wireless network interface card with an integrated radio antenna, or a modem (e.g., ISDN, DSL, or cable modem).

Network link(s) 420 typically provide data communication through one or more networks to other data devices. For example, a network link 420 may provide a connection through a local network 422 to a host computer 424 or to data equipment operated by an Internet Service Provider (ISP) 426. ISP 426 in turn provides data communication services through the world wide packet data communication network now commonly referred to as the "Internet" 428. Local network(s) 422 and Internet 428 use electrical, electromagnetic or optical signals that carry digital data streams. The signals through the various networks and the signals on network link(s) 420 and through communication interface(s) 418, which carry the digital data to and from computing device 400, are example forms of transmission media.

Computing device 400 can send messages and receive data, including program code, through the network(s), network link(s) 420 and communication interface(s) 418. In the Internet example, a server 430 might transmit a requested code for an application program through Internet 428, ISP 426, local network(s) 422 and communication interface(s) 418.

The received code may be executed by processor 404 as it is received, and/or stored in storage device 410, or other non-volatile storage for later execution.

Basic Software System

Figure 5:
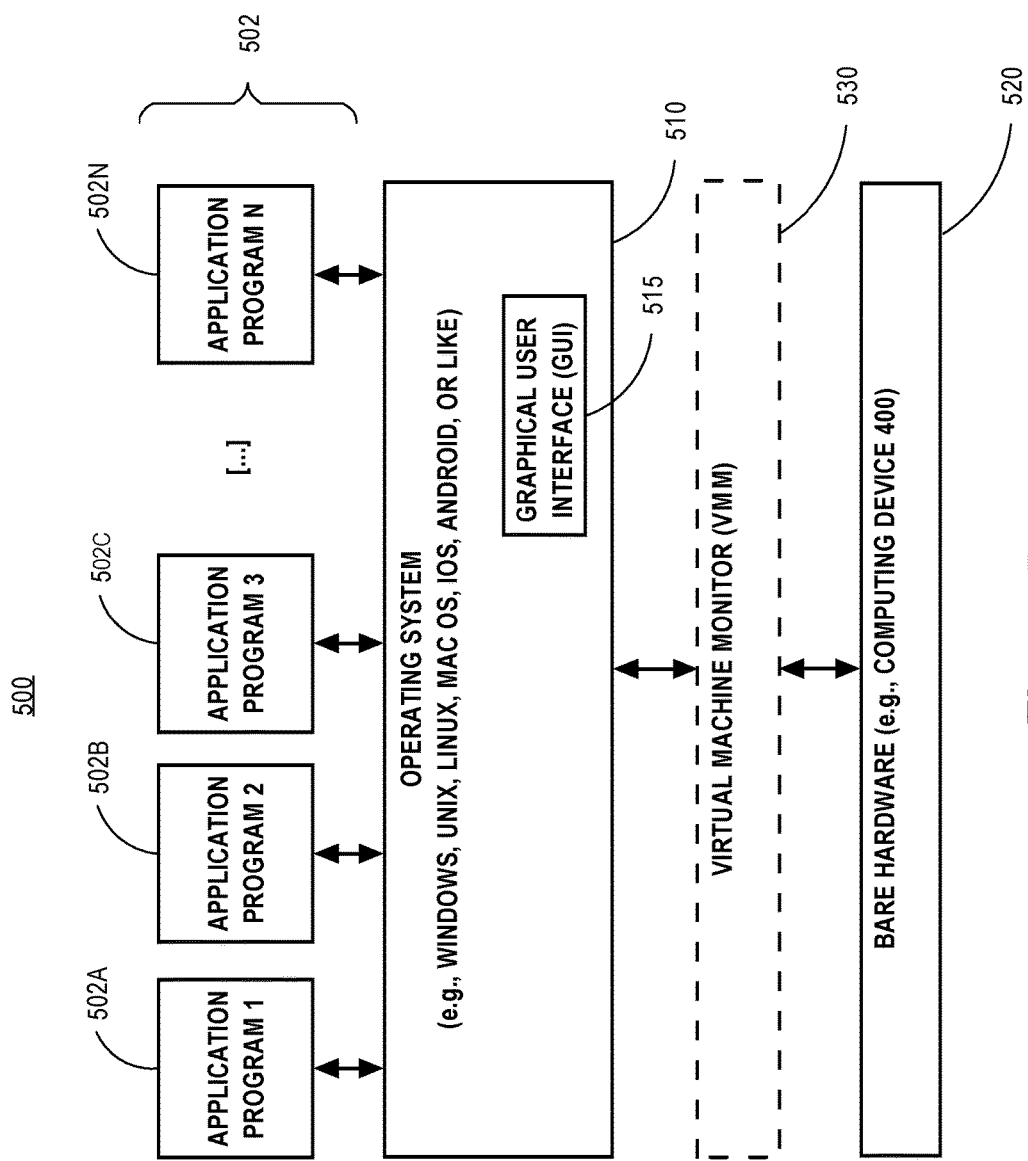
FIG. 5 is a block diagram of a basic software system for controlling the operation of the computing device.

FIG. 5 is a block diagram of a basic software system 500 that may be employed for controlling the operation of computing device 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing device 400. Software system 500, which may be stored in system memory (RAM) 406 and on fixed storage (e.g., hard disk or flash memory) 410, includes a kernel or operating system (OS) 510.

OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by system 500. The applications or other software intended for use on device 500 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by system 500 in accordance with instructions from operating system 510 and/or application(s) 502. GUI 515 also serves to display the results of operation from OS 510 and application(s) 502, whereupon the user may supply additional inputs or terminate the session (e.g., log off).

OS 510 can execute directly on bare hardware 520 (e.g., processor(s) 404) of device 400. Alternatively, a hypervisor or virtual machine monitor (VMM) 530 may be interposed between bare hardware 520 and OS 510. In this configuration, VMM 530 acts as a software "cushion" or virtualization layer between OS 510 and bare hardware 520 of device 400.

VMM 530 instantiates and runs one or more virtual machine instances ("guest machines"). Each guest machine comprises a "guest" operating system, such as OS 510, and one or more applications, such as application(s) 502, designed to execute on the guest operating system. VMM 530 presents the guest operating systems with a virtual operating platform and manages the execution of the guest operating systems.

In some instances, VMM 530 may allow a guest operating system to run as if it is running on bare hardware 520 of device 400 directly. In these instances, the same version of the guest operating system configured to execute on bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:

1. A method, comprising:
at one or more computing devices comprising one or more processors and storage media storing one or more computer programs executed by the one or more processors to perform the method, performing operations comprising:
causing a content item work area to be displayed at a user computing device, the user computing device associated with a particular user account, the particular user account held with a content management system, the content item work area allowing a user-change to be made to a content item, the content item at least partially displayed in the content item work area when the user-change is made, the content item associated with the particular user account;

detecting the user-change to the content item, the user-change detected made via the content item work area;

determining that the content item is shared among a plurality of user accounts, the plurality of user accounts held with the content management system;

wherein the determining that the content item is shared is based at least in part on the content item being accessible, in the content management system, to the plurality of user accounts;

wherein the plurality of user accounts includes the particular user account;

determining whether the particular user account has received a comment feature-instruction notification for a commenting feature provided by the content management system;

determining whether the particular user account has used the commenting feature;

based at least in part on all of: (a) the detecting the user-change to the content item, (b) the determining that the content item is shared, (c) determining that the particular user account has not received the comment feature-instruction notification, and (d) determining that the particular user account has not used the commenting feature: causing a customized user notification to be displayed at a user computing device;

wherein the customized user notification provides educational information about use of the commenting feature and provides an interactive link to access the commenting feature;

wherein the commenting feature, when accessed via the interactive link provided in the customized user notification allows a user-comment to be made on the user-change to the content item; and wherein the user-comment on the user-change to the content item, when made via the commenting feature, is accessible via the content management system to the plurality of user accounts with which the content item is shared.

2. The method of claim 1, wherein the content item is stored in a shared folder accessible by the particular user account and one or more collaborator user accounts.

3. The method of claim 2, further comprising:
in response to receiving a request to access the commenting feature through the customized user notification, providing an interface for adding a comment to the content item.

4. The method of claim 3, further comprising:
receiving the comment to add to the content item; and
synchronizing the comment to the particular user account and the one or more collaborator user accounts.

5. The method of claim 3, wherein the providing an interface for adding a comment to the content item comprises prepopulating a comment in the interface.

6. The method of claim 1, wherein the customized user notification is an email, an SMS message, or a toast notification.

7. The method of claim 1, wherein the causing the customized user notification to be displayed is delayed by a predetermined period of time.

8. The method of claim 1, further comprising:
determining whether the content management system has received a comment to add to the content item from a user computing device; and
in response to determining that the content management system has received a comment to add to the content item from a user computing device, preventing sending a customized user notification.

9. A system, comprising:
storage media;
one or more processors; and
one or more programs stored in the storage media and configured for execution by the one or more processors, the one or more programs comprising instructions for:
causing a content item work area to be displayed at a user computing device, the user computing device associated with a particular user account, the particular user account held with a content management system, the content item work area allowing a user-change to be made to a content item, the content item at least partially displayed in the content item work area when the user-change is made, the content item associated with the particular user account;

detecting the user-change to the content item, the user-change detected made via the content item work area;

determining that the content item is shared among a plurality of user accounts, the plurality of user accounts held with the content management system;

wherein the determining that the content item is shared is based at least in part on the content item being accessible, in the content management system, to the plurality of user accounts;

determining whether the particular user account has received a comment feature-instruction notification for a commenting feature provided by the content management system;

determining whether the particular user account has used the commenting feature;

based at least in part on all of: (a) the detecting the user-change to the content item, (b) the determining that the content item is shared, (c) determining that the particular user account has not received the comment feature-instruction notification, and (d) determining that the particular user account has not used the commenting feature: causing a customized user notification to be displayed at a user computing device;

wherein the customized user notification provides educational information about use of the commenting feature and provides an interactive link to access the commenting feature;

wherein the commenting feature, when accessed via the interactive link provided in the customized user notification allows a user-comment to be made on the user-change to the content item; and wherein the user-comment on the user-change to the content item, when made via the commenting feature, is accessible via the content management system to the plurality of user accounts with which the content item is shared.

10. The system of claim 9, wherein the content item is stored in a shared folder accessible by the particular user account and one or more collaborator user accounts.

11. The system of claim 10, further comprising one or more programs stored in the storage media and configured for execution by the one or more processors, the one or more programs comprising instructions for:

in response to receiving a request to access the commenting feature through the customized user notification, providing an interface for adding a comment to the content item.

12. The system of claim 11, further comprising one or more programs stored in the storage media and configured for execution by the one or more processors, the one or more programs comprising instructions for:

receiving a comment to add to the content item; and synchronizing the comment to the particular user account and the one or more collaborator user accounts.

13. The system of claim 11, wherein the providing an interface for adding a comment to the content item comprises prepopulating a comment in the interface.

14. The system of claim 9, wherein the customized user notification is an email, an SMS message, or a toast notification.

15. The system of claim 9, wherein the causing the customized user notification to be displayed is delayed by a predetermined period of time.

16. The system of claim 9, further comprising one or more programs stored in the storage media and configured for execution by the one or more processors, the one or more programs comprising instructions for:

determining whether the content management system has received a comment to add to the content item from a user computing device; and in response to determining that the content management system has received a comment to add to the content item from a user computing device, preventing sending a customized user notification.

17. One or more non-transitory computer-readable media storing one or more computer programs configured for execution by one or more processors, the one or more computer programs comprising instructions which, when executed by the one or more processors, are capable of causing the one or more processors to perform:

causing a content item work area to be displayed at a user computing device, the user computing device associated with a particular user account, the particular user account held with a content management system, the content item work area allowing a user-change to be made to a content item, the content item at least partially displayed in the content item work area when the user-change is made, the content item associated with the particular user account;

detecting the user-change to the content item, the user-change detected made via the content item work area;

determining that the content item is shared among a plurality of user accounts, the plurality of user accounts held with the content management system;

wherein the determining that the content item is shared is based at least in part on the content item being accessible, in the content management system, to the plurality of user accounts;

wherein the plurality of user accounts includes the particular user account;

determining whether the particular user account has received a comment feature-instruction notification for a commenting feature provided by the content management system;

determining whether the particular user account has used the commenting feature;

based at least in part on all of: (a) the detecting the user-change to the content item, (b) the determining that the content item is shared, (c) determining that the particular user account has not received the comment feature-instruction notification, and (d) determining that the particular user account has not used the commenting feature: causing a customized user notification to be displayed at a user computing device;

wherein the customized user notification provides educational information about use of the commenting feature and provides an interactive link to access the commenting feature;

wherein the commenting feature, when accessed via the interactive link provided in the customized user notification allows a user-comment to be made on the user-change to the content item; and wherein the user-comment on the user-change to the content item, when made via the commenting feature, is accessible via the content management system to the plurality of user accounts with which the content item is shared.

18. The one or more non-transitory computer-readable media of claim 17, wherein the content item is stored in a shared folder accessible by the particular user account and one or more collaborator user accounts.

19. The one or more non-transitory computer-readable media of claim 18, wherein the instructions, when executed by the one or more processors, are further capable of causing the one or more processors to perform:

in response to receiving a request to access the commenting feature through the customized user notification, providing an interface for adding a comment to the content item.

20. The one or more non-transitory computer-readable media of claim 19, wherein the instructions, when executed by the one or more processors, are further capable of causing the one or more processors to perform:

receiving the comment to add to the content item; and synchronizing the comment to the particular user account and the one or more collaborator user accounts.

21. The one or more non-transitory computer-readable media of claim 19, wherein the providing an interface for adding a comment to the content item comprises prepopulating a comment in the interface.

\* \* \* \* \*